United States Patent [19]

McDaniel

[11] Patent Number: 4,477,586
[45] Date of Patent: Oct. 16, 1984

[54] POLYMERIZATION OF OLEFINS

[75] Inventor: Max P. McDaniel, Bartlesville, Okla.

[73] Assignee: Phillips Petroleum Company, Bartlesville, Okla.

[21] Appl. No.: 464,095

[22] Filed: Feb. 4, 1983

Related U.S. Application Data

[63] Continuation-in-part of Ser. No. 412,059, Aug. 27, 1982, abandoned.

[51] Int. Cl.$^3$ ............................. C08F 4/64; C08F 4/68; C08F 4/62
[52] U.S. Cl. .................................. 502/104; 502/116; 502/119; 502/120; 502/122; 502/125; 502/121; 502/123; 526/128; 526/139; 526/141
[58] Field of Search ................ 502/104, 119, 120, 125

[56] References Cited

U.S. PATENT DOCUMENTS

| | | | |
|---|---|---|---|
| 3,135,809 | 6/1964 | Bosmajian | 502/114 X |
| 3,166,542 | 1/1965 | Orzechowski et al. | 260/93.7 |
| 3,362,916 | 1/1968 | Price | 502/125 |
| 3,513,151 | 5/1970 | Santiago | 502/125 X |
| 3,676,418 | 7/1972 | Tashiro et al. | 260/88.2 |
| 3,787,384 | 1/1974 | Stevens et al. | 260/94.9 |
| 3,809,657 | 5/1974 | Mueller-Tamm et al. | 252/429 C |
| 3,907,759 | 9/1975 | Okada et al. | 260/88.2 |
| 3,969,332 | 7/1976 | Gloriod et al. | 526/128 |
| 4,173,547 | 11/1979 | Graff | 252/429 B |
| 4,235,746 | 11/1980 | Dietz | 252/429 C |
| 4,284,748 | 8/1981 | Welch | 526/119 |
| 4,391,736 | 7/1983 | Capshew | 502/110 |

OTHER PUBLICATIONS

Ser. No. 101,375, filed 12/07/79.
Ser. No. 412,347, filed 08/27/82.

*Primary Examiner*—Patrick Garvin

[57] ABSTRACT

A first reactant selected from arylsilanol, hydrocarbyl amine, hydrocarbylphosphine oxide, and hydrocarbyloxyphosphite is combined with a second reactant selected from halogenated transition metal compound and an organometal compound to form a product which is catalytically active for olefin polymerization after optionally first having been deposited on a particulate diluent.

15 Claims, No Drawings

POLYMERIZATION OF OLEFINS

BACKGROUND OF THE INVENTION

This application is a continuation-in-part of application Ser. No. 412,059, filed Aug. 27, 1982, now abandoned.

This invention relates to a process for polymerizing olefins. In another aspect, this invention relates to a process for making a polymerization catalyst. In another aspect, this invention relates to a process for polymerizing alpha-olefins using a catalyst system wherein the catalyst is prepared by a novel process. In another aspect, this invention relates to a novel process for forming a catalyst which can be used with a cocatalyst to form a catalyst system for the polymerization of alpha-olefins. In yet another aspect, the invention relates to a composition of matter useful as a catalyst precursor.

It is known to polymerize alpha-olefins and mixtures thereof at low pressures with coordination catalysts. In these processes, the catalysts used are prepared from mixtures of compounds of transition elements of Subgroups IVB, VB, VIB of the Periodic Table and the hydrides or organometallic compounds of the elements of Groups I to III of the Periodic Table. The Periodic Table referred to herein is as shown on page B-2, 45th Edition (1964), of the Handbook of Chemistry and Physics, Chemical Rubber Co. The polymerization is generally carried out in suspension, in solution or even in a gaseous phase.

Because of greater process economics, it is desirable to carry out olefin polymerization reactions, particularly polymerization reactions involving ethylene and predominantly ethylene-containing copolymers in an inert diluent at a temperature at which the resulting polymer does not go into solution, with the polymer being recovered without elaborate steps to remove the catalyst. In order for this more economical method of manufacture to be feasible from a practical standpoint the catalyst must be capable of producing polymer in high productivities in order to maintain the residual catalyst level in the final polymer at a very low level. The activity of an olefin polymerization catalyst is thus one important factor in the continuous search for a catalyst useful for the polymerization of alpha-olefins. It is also desirable that the process used in forming the catalyst be such as to allow ease in preparation and to allow control over the final catalyst formed. It is further desirable to provide a catalyst for producing polyolefins suitable for use in rotational molding processes.

In addition to catalyst productivity another important aspect of a polymerization process and catalyst is the properties of the polymer particles produced. It is desirable to produce polymer particles which are characterized by strength, uniformity of size, and relatively low amount of fines. Although polymer fluff having relatively high percentages of fines can be handled with plant modifications, production of a polymer in high productivity with low fines content is highly desirable.

OBJECTS OF THE INVENTION

It is an object of this invention, therefore, to provide an improved process for the polymerization of alpha-olefins.

Another object of this invention is to provide a novel and improved method for preparing a catalyst composition.

A further object of this invention is to provide a novel catalyst composition well adapted for the polymerization of alpha-olefins.

STATEMENT OF THE INVENTION

According to certain aspects of the present invention, there is provided a catalyst precursor which results from the combination of a first reactant selected from the group consisting of an arylsilanol, a secondary amine, and an organophosphorus compound which can be a hydrocarbyl phosphine oxide, or a hydrocarbyl phosphite;

wherein the arylsilanol is represented by the formula $$R_2Si(OH)_2 \text{ or } R_3SiOH$$

where each R represents a substituted or unsubstituted aryl group containing from 6 to about 20 carbon atoms and can be the same or different from each other;

wherein the secondary amine is represented by the formula $$R'_2NH$$

where each R' represents a substituted or unsubstituted hydrocarbyl group containing from 1 to about 20 carbon atoms and can be the same or different from each other provided that the total number of carbon atoms is sufficient to impart to the amine solubility in hydrocarbon solvent;

wherein the hydrocarbyl phosphine oxide is represented by the formula $$R'_3P=O$$

where each R' represents a substituted or unsubstituted hydrocarbyl group containing from 1 to about 20 carbon atoms and can be the same or different from each other provided that the total number of carbon atoms is sufficient to impart to the phosphine oxide solubility in hydrocarbon solvent;

wherein the hydrocarbyl phosphite is represented by the formula $$(R'O)_3P$$

where each R' represents a substituted or unsubstituted hydrocarbyl group containing from 1 to about 20 carbon atoms and can be the same or different from each other provided that the total number of carbon atoms is sufficient to impart to the hydrocarbyl phosphite solubility in hydrocarbon solvent;

with a second reactant selected from the group consisting of a halogenated transition metal compound and an organometal compound;

wherein the halogenated transition metal compound is represented by the formula $$M(OR')_rX_{w+1}$$

where M represents a transition metal selected from Group IVB or VB of the Periodic Table, preferably titanium, zirconium or hafnium, R' comprises a hydrocarbyl group containing from 1 to about 20 carbon atoms and preferably is a hydrocarbyl group containing from 1 to about 20 carbon atoms, $v=0$, 1, 2, or 3, X comprises a halogen selected from chlorine, bromine and iodine, preferably chlorine, $w=1$, 2 or 3 and $v+w+1$ equals the valence of M;

wherein the metal of the organometal compound is selected from the metals of Groups I, II and III of the Periodic Table and is preferably magnesium.

When the second reactant comprises the halogenated transition metal compound, the resulting catalyst precursor can be combined with an organometal compound which contains a metal selected from Groups I to III of the Periodic Table, preferably magnesium, to yield a polymerization catalyst according to the invention. The catalyst can be made more active by treating it with a halide ion exchanging source which can be the same or different from the halogenated transition metal compound used as the second reactant.

When the second reactant comprises the organometal compound, the resulting catalyst precursor can be combined with a halogenated transition metal compound represented by the formula $$M(OR')_v X_{w+1}$$

where M represents a transition metal selected from Group IVB or VB of the Periodic Table, preferably titanium, zirconium or hafnium, R' comprises a hydrocarbyl group containing from 1 to about 20 carbon atoms, $v=0$, 1, 2 or 3, X comprises a halogen selected from chlorine, bromine and iodine, preferably chlorine, $w=1$, 2 or 3 and $v+w+1$ equals the valence of M, and the resulting composite need not be combined with a halide ion exchanging source to yield good results.

Without intending to be so limited, the catalyst precursor resulting from the arylsilanol and the halogenated transition metal compound will be represented by the formula $$R_t Si(OH)_u (OM(OR')_v X_w)_z$$

for the purposes of further discussion, although the material may only be a monomer in, or intermediate toward, the desired reaction product. In the above formula, R comprises an aryl group containing from 6 to about 20 carbon atoms, R' comprises a hydrocarbyl group containing from about 1 to about 20 carbon atoms, R' preferably being alkyl, cycloalkyl or aryl, M comprises a transition metal selected from Group IVB or VB of the Periodic Table, M preferably being titanium, zirconium or hafnium, most preferably titanium, $t=2$ or 3, $u=0$ or 1, $v=0$, 1, 2 or 3, $w=1$, 2, or 3, X comprises a halogen selected from chlorine, bromine, iodine, preferably chlorine, $z=1$ or 2, $v+w+1$ equals the valence of M and $t+u+z=4$. The reaction product is the precursor of a highly active polymerization catalyst. This composition of the invention can be formed by contacting 1 mole of the arylsilanol, with at least 1 mole of a halogenated transition metal compound, preferably a tetravalent transition metal compound, which has been optionally substituted with one or more hydrocarbyloxide moieties, to form the catalyst precursor. The resulting catalyst precursor can be contacted with an organometallic compound to form an organometal-treated composition and the organometal-treated composition contacted with a halide ion exchanging source to form an organometal and halide treated material which can be employed as a component of a highly active polymerization catalyst system.

It can be desirable to deposit the catalyst precursor on a particulate diluent prior to treatment with the organometallic compound and the halide ion exchanging source because the polymer particles produced in processes utilizing the catalytic component can replicate the shape of the catalyst particles. The catalytic component is preferably utilized as part of a catalyst system also employing a cocatalyst selected from a hydride or organometal compound of a metal selected from Groups IA, IIA, and IIIA of the Periodic Table. When the catalytic component has been supported on a particulate material, the catalyst system has exceptional activity in a polymerization process for the polymerization of alpha-olefins. Preferably, the polymerization process is conducted in the presence of diluent, added hydrogen and ethylene.

DETAILED DESCRIPTION OF THE INVENTION

According to certain aspects of the invention, a first reactant selected from an arylsilanol, hydrocarbylamine or organophosphorous compound is contacted with a second reactant which can be a halogenated transition metal compound which has optionally been substituted with at least one hydrocarbyloxide moiety. The contacting is conducted under conditions so as to provide a chemical reaction between the arylsilanol, hydrocarbylamine or organophosphorous compound and the halogenated transition metal compound.

Preferably, the arylsilanol is represented by the formula $$R_t Si(OH)_{u+1}$$

where R, t and u are as previously defined. Examples of arylsilanols include diarylsilanediols such as diphenylsilanediol, triarylsilanols such as triphenylsilanol and the like and mixtures.

Preferably, the hydrocarbylamine reactant will be represented by the formula $$R'_2 NH$$

where R' is as previously defined. More preferably, R'=R for reasons of solubility. An example of a suitable arylamine is diphenylamine.

Preferably, the organophosphorous compound will be represented by the formula $$R'_3 P=O \text{ or } P(OR')_3$$

where R' is as previously defined. Preferably, R'=R. Examples of suitable arylphosphorous compounds are triphenylphosphine oxide and triphenylphosphite.

The halogenated transition metal compound which is utilized as the second reactant in this embodiment is preferably represented by the formula $$M(OR')_v X_{w+1}$$

where M, R', X, v, and w are as previously defined.

There is provided from the combination of the arylsilanol and the halogenated transition metal compound a composition of matter which shall be hypothetically represented by the formula $$R_t Si(OH)_u (OM(OR')_v X_w)_z$$

where R comprises an aryl group containing from about 6 to about 20 carbon atoms, R' comprises a hydrocarbyl group containing from about 1 to about 20 carbon atoms, R' preferably being alkyl or aryl, M comprises a transition metal selected from Group IVB, VB or VIB, preferably IVB or VB of the Periodic Table, preferably being titanium, zirconium or hafnium, most preferably titanium, t=2 or 3, u=0 or 1, v=0, 1, 2 or 3, w=1, 2, 3, X comprises a halogen selected from the group consisting of chlorine, bromine, iodine, preferably chlorine, z=1 or 2, v+w+1 equals the valence of M and t+u+z=4. This composition is a catalyst precursor of the invention.

Preferably in the above formula, M represents titanium, R comprises as aryl group having from 6 to about 10 carbon atoms, t is 2 or 3, u is 0 or 1, v is 0, w is 3, X is chlorine, and z is 1 or 2, because compositions represented by such a formula are expected to yield especially good results. Most preferably, R represents a phenyl radical, t equals 2 or 3, and u equals 0 or 1, because these compositions have been tested with good results.

Usually, the arylsilanol, hydrocarbylamine or organophosphorous compound and the halogenated transition metal compound are reacted in a suitable solvent or diluent, e.g., a hydrocarbon such as toluene. Conditions are not critical. Concentrations can range from about 1 to about 10 wt. % based on the weight of the solution for each component, and temperatures of about 20° to 40° C., for example, are suitable.

The catalyst precursor of this embodiment in which halogenated transition metal compound was used as the second reactant can be made more active by contacting it with an organometal treating agent to form an organometal-treated composition and contacting the organometal-treated composition with a halide ion exchanging source to form the catalyst. The organometal and halide treated composition can be used as a component of a highly active polymerization catalyst system.

Generally, the metal of the organometal with which the catalyst precursor of this embodiment where the halogenated transition metal compound was used as the second reactant is treated is selected from the metals of Groups I to III of the Periodic Table. Some organometal compounds suitable for use as the organometal treating agent are those in which the metal is selected from metals of Group I, II and Group III of the Periodic Table. Organo-metallic compounds suitable for use include, for example, lithium alkyls, Grignard reagents, dihydrocarbylmagnesium compounds, dihydrocarbylzinc compounds, organoaluminum compounds, mixtures thereof and so forth. Preferably, the organometal is selected from dialkylmagnesium compounds, mixtures comprising dialkylmagnesium compound and trialkylaluminum compound, and Grignard reagents in which each hydrocarbon radical contains from about 1 to about 10 carbon atoms. As used, the preferred Grignard reagents are represented by $RM_gX$ where R is hydrocarbyl having 1–10 carbon atoms and X is halogen. The most preferred organometal comprises di-n-butyl-magnesium because it has been employed to produce a highly active component of the catalyst system. The amount of organometal utilized can vary over a wide range. Generally, a sufficient amount of the organometal will be utilized to provide a molar ratio of Group I, II or III metal to transition metal in the catalyst precursor in the range from about 0.01:1 to about 10:1, more generally within the range of from about 0.1:1 to about 1:1, preferably within a range of about 0.4:1 to about 0.6:1 since the latter range usually produces a catalyst which can be employed as an especially active ethylene polymerization catalyst.

Treatment of the catalyst precursor of this embodiment where the halogenated transition metal compound was used as the second reactant with the organometal compound is conducted under conditions so as to provide a reaction between the organometal compound and the catalyst precursor. For example, an organometal compound in solution form can be contacted with the catalyst precursor in a hydrocarbon diluent such as n-heptane at about room temperature (23° C.). Dilute solutions can be employed, e.g., 0.1 molar precursor and 0.3 molar organometal. The organometal-treated composition can then contacted with a halide ion exchanging source. The treatment can be carried out by contacting the treated reaction product with the halide ion exchanging source compound at a temperature sufficient to provide a reaction. Suitable preferred halide ion exchange source compounds are halogenated metal or halogenated nonmetal compounds which can be represented by the formula $M'X_a(OR')_{b-a}$ in which M' is selected from the group consisting of zirconium, titanium, vanadium, silicon and tin, b is the valence of M', X comprises a halogen selected from bromine, chlorine or iodine, a is 1, 2, 3, 4, or 5 and is less than or equal to b and R' represents a hydrocarbyl group such as an alkyl, cycloalkyl or aryl group and can contain from 1 to about 20 carbon atoms. More preferably, a equals b and is 2, 3 or 4. Specific examples of suitable compounds include titanium tetrachloride, titanium dibromodichloride, titanium iodotrichloride, n-butoxytrichlorotitanium, chlorotrido-decycloxytitanium, bromotricyclohexyloxytitanium, diphenoxydichloro-titanium, zirconium tetrachloride, vanadium pentabromide, vanadium tetrachloride, silicon tetrachloride and the like and combinations thereof. A presently preferred compound comprises a titanium tetrahalide represented by the formula $TiX_4$ wherein X represents a halogen atom, for example, chlorine or bromine. Titanium tetrachloride is presently preferred because of availability and relatively low cost.

Generally, treating the organometal treated catalyst with a halide ion exchanging source takes place in a suitable diluent such as a hydrocarbon diluent, for example, n-pentane, n-heptane, cyclohexane, benzene, xylenes, and the like, to facilitate the treating process. The treating temperature can be selected over a relatively broad range and is normally within a range of about 0° C. to about 200° C.; however, a temperature within the range of from about 80° C. to 180° C. is usually employed.

When the embodiment of the invention where the first reactant is selected from the group $R_2Si(OH)_2$, $R_3SiOH$, $R'_2NH$, $R_3'P=O$ and $(R'O)_3P$ and the second reactant is the organometal compound, the first reactants are as previously described. The organometal compound employed as the second reactant is selected from the same class of materials previously described as useful for treating the catalyst precursor resulting from using the halogenated transition metal compound as the second reactant. The preferred organometal is dialkylmagnesium, most preferably di-n-butylmagnesium. The reactants can be contacted in solution form, dilute solutions can be employed and the reaction can be conducted at room temperature. The amount of organometal utilized will preferably generally be in the range of about 0.01 to about 10 moles of organometal per mole of first reactant, usually from about 0.2 to about 5 moles of organometal per mole of first reactant, and most preferably from about 0.7 to about 1.5 moles of organometal per mole of first reactant. The resulting precursor can then be treated with a halogenated transition metal compound of the type used as the second reactant. The halogenated transition metal compound is preferably used in excess amount, such as in an amount of 2 moles or more per mole of first reactant residue in the reaction product, since this procedure avoids having to carry out a separate washing step with halogenating agent in oder to produce a highly active catalyst. The preferred halogenated transition metal compound is $TiCl_4$ because of availability and low cost and because it has been used with good results.

It can be advantageous to support the catalyst precursor on a particulate material prior to its treatment with the organometal compound and/or the halide ion exchanging source. By selecting a suitable particulate diluent having appropriate characteristics, the particle characteristics of the polymer produced in processes employing the final catalyst composition can be controlled. Generally, the catalyst precursor will be impregnated onto the particulate component. The particulate component can be selected from the group consisting of silica, silica-alumina, silica-titania, silica-boria, silica-thoria, silica-zirconia, aluminum phosphate, magnesium dichloride, magnesium oxide, polyphenylene sulfide, polyolefin, e.g. polyethylene, polypropylene, and mixtures thereof. Preferred particulate materials are generally characterized by containing surface hydroxyl groups. Thus, of the above, silica, aluminum phosphate, silica-alumina, silica-titania, silica-boria, silica-thoria, and silica-zirconia and mixtures thereof are particularly preferred especially where the silica or aluminum phosphate content ranges from about 80 to about 100 weight percent. The activity of the final catalyst system will be influenced by the temperature at which the particulate material was calcined. Generally, where particulate materials containing silica are utilized, calcination will be carried out at a temperature in the range of from about 260° to about 1000° C., usually in the range from about 500° to about 1000° C., prior to supporting the catalyst precursor thereon.

Generally, the mole ratio of support to catalyst precursor will range from about 5:1 to about 75:1, more preferably from about 10:1 to about 50:1. When this embodiment of the invention is practiced, the resulting composition can be slurried into a suitable solvent and then treated with the organometal compound and the halide ion exchanging source. The amounts of organometal compound and halide ion exchanging source utilized bear a relationship to the amount of catalyst precursor as previously discussed.

While it may not be necessary in all instances to employ a cocatalyst with the catalyst of the present invention, the use of cocatalyst is recommended for good results. Preferably then, the reaction product, preferably after halide treatment, is combined with a cocatalyst, to form a catalyst system useful for the polymerization of olefins. The cocatalyst usually comprises a hydride or an organometallic compound wherein the metal is preferably selected from Groups IA, IIA and IIIA of the Periodic Table. In other words, the cocatalyst can be a hydride of the metals of Groups IA, IIA, and IIIA or an organocompound of these metals.

The cocatalytic component of the catalyst system is preferably an organoaluminum compound of the formula $AlR'_cY_{3-c}$ where R' represents a hydrocarbyl radical containing from 1 to about 20 carbon atoms, Y represents a monovalent radical selected from the group consisting of hydrogen and halogen, and c is 1, 2, or 3. Exemplary compounds include trihydrocarbylaluminum compounds such as trimethylaluminum, triethylaluminum, tridodecylaluminum, trieicosylaluminum, triphenylaluminum, dihydrocarbylaluminum halides such as diethylaluminum chloride, dibutylaluminum bromide; hydrocarbylaluminum dihalides such as methylaluminum dichloride, isopropylaluminum dibromide; and mixtures such as hydrocarbylaluminum sesquihalides such as ethylaluminum sesquichloride. Presently preferred are trialkylaluminum compounds, represented by the formula $AlR''_3$ wherein R'' represents an alkyl radical having from about 2 to about 8 carbon atoms.

It is within the scope of this invention to employ one or more adjuvants, these being polar organic compounds, i.e., Lewis bases (electron donor compounds) with the titanium tetrahalide component or the cocatalyst component or both. Suitable compounds for this purpose are described in U.S. Pat. No. 3,642,746, the disclosure of which is incorporated by reference. They include alcoholates, aldehydes, amides, amines, arsines, esters, ethers, ketones, nitriles, phosphines, phosphites, phophoramides, sulfones, sulfoxides and stibines. Exemplary compounds include sodium ethoxide, benzaldehyde, acetamide, triethylamine, trioctyl arsine, ethyl acetate, diethyl ether, acetone, benzonitrile, triphenyl phosphine, triphenyl phosphite, hexamethyl phosphoric triamide, dimethyl sulfone, dibutyl sulfoxide, and triethyl stibine and N,N-dimethylaniline.

Preferred esters are the lower alkyl esters (1 to 4 carbon atoms per molecule) of benzoic acid which may be additionally substituted in the para position to the carboxyl group with a monovalent radical selected from the group consisting of —F, —Cl, —Br, —I, —$CH_3$, —OR''', —OOCR''', —SH, —NH, —NR'''$_2$, —NHCOR''', —$NO_2$, —CN, —CHO, —COR''', —COOR'''. —$CONH_2$, —CONR'''$_2$, —$SO_2$R''', and —$CF_3$, where R''' represents hydrocarbyl having from 1 to 10 carbon atoms. Exemplary compounds include ethyl anisate (ethyl p-methoxybenzoate), methyl para-toluate, methyl benzoate, ethyl benzoate, ethyl p-dimethylaminobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred compounds are ethyl anisate, ethyl benzoate and methyl para-toluate. Generally, if an adjuvant is used at all, it is used in the polymerization of propylene. In the preferred embodiments of this invention where ethylene is polymerized, an adjuvant is generally not used.

The molar ratio of organoaluminum compound(s) to adjuvant(s) is generally in the range of about 1:1 to about 300:1. The molar ratio of titanium compound to adjuvant(s) is generally in the range of about 1:1 to about 200:1. The atom ratio of aluminum to titanium can range from about 20:1 to about 10,000:1 more preferably from about 75:1 to about 5,000:1. The atom ratio of aluminum to magnesium can range from about 0.1:1 to about 4:1, more preferably from about 0.5:1 to about 2:1.

Any alpha-olefin, or mixture thereof, can be polymerized in the presence of the catalyst of the present invention with the preferred monomer being ethylene or ethylene plus another higher aliphatic mono-1-olefin containing from 3-10 carbon atoms. The catalysts are of particular utility in the polymerization of ethylene or the copolymerization of ethylene and minor amounts of propylene, butene-1 or hexene-1, in an inert hydrocarbon diluent at a temperature at which the resulting polymer is insoluble in the diluent. By minor amounts is meant up to about a total of 20 mole % comonomer(s).

Broadly, the polymerization conditions employed in this invention are similar to certain known processes in which a catalyst system comprising a titanium tetrahalide and an organoaluminum compound are used. The alpha-olefin is polymerized by contact with the catalyst system of this invention in solution, in suspension or in gaseous phase.

In the preferred polymerization of ethylene in a particle form system, the polymerization is conducted in the presence of a diluent under conditions of temperature and pressure such that the diluent is in the liquid phase and the resulting polymer is insoluble in the diluent. The polymerization temperature generally falls in the range of 0° to 150° C., more preferably about 40° to 112° C. Any convenient partial pressure of ethylene can be used. The partial pressure generally falls within the range of about 10 to 500 psig (69 to 3450 kPa). The concentration of titanium compound per liter of diluent during the polymerization can vary within the range of about 0.0005 to 10, more preferably from about 0.001 to 2 millimoles per liter of diluent.

The diluent used in the polymerization process can be excess monomer or one which is unreactive under the conditions employed. The diluent is preferably a hydrocarbon such as isobutane, n-pentane, cyclohexane and the like.

As is known in the art, control of the molecular weight of the polymer can be obtained by the presence of hydrogen in the reactor during polymerization. Because of the high degree of activity of the catalyst of the invention, the polymer produced generally contains less than 100 ppm and even frequently less than 50 ppm of transition metals and can be used without the necessity to carry out a purification treatment.

The polymerization process used for producing ethylene polymers, according to this invention, can be any of the well-known processes including batch and continuous processes.

It is convenient when polymerizing ethylene in a bench scale process, for example, to conduct the polymerization batchwise in a stirred reactor employing a dry hydrocarbon diluent inert in the process such as isobutane, n-heptane, methylcyclohexane, benzene, toluene, and the like at a reactor temperature of about 80° C. and a reactor pressure of about 290 psia (2.0 MPa). Ethylene is admitted to the reactor as required to maintain the desired pressure. Molecular weight control agents such as hydrogen, can be employed in the reactor as known in the art to adjust the molecular weight of the polymer.

When the selected polymerization time is reached the reaction can be terminated by discontinuing the flow of ethylene and comonomer, if used, venting unreacted monomer(s) and diluent and recovering the polymer. If desired, the recovered product can be treated to deactivate or remove catalyst residues such as by an alcohol wash, can be stabilized by admixture with an antioxidant(s) and can be dried to remove residual solvent, if present and as is known in the art. The final product can be further processed into pellets and/or converted into the final shaped product.

In a continuous process, a suitable reactor such as a loop reactor is continuously charged with suitable quantities of solvent or diluent, catalyst, cocatalyst, ethylene, hydrogen (if any), and comonomer (if any). Reactor product is continuously withdrawn and solid polymer recovered from it by suitable means such as by flashing.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above, include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

EXAMPLE I (CATALYST PREPARATION)

A series of catalysts was prepared in a dry box containing an inert atmosphere, e.g. argon, at about room temperature (25° C.), by reacting the specified components. When the resulting composition was further treated with $TiCl_4$, that treatment occurred by reacting the composition with a solution containing about 20 weight percent $TiCl_4$ dissolved in n-heptane for about 5–10 minutes at about 100° C.

Generally, a toluene solution containing the reaction product of the organic compound and $TiCl_4$ was mixed with a slurry of the activated silica, when employed, and toluene. The toluene was evaporated from the mixture, the solids reslurried in n-heptane and the slurry was contacted with a hydrocarbon solution comprising the organometallic compound. Usually, the organometallic compound employed was a n-heptane solution of di-n-butylmagnesium and triethylaluminum (molar ratio Mg:Al of 7:1) available commercially as Magala® from Texas Alkyls. The resulting solids were recovered by evaporating the solvent, washing with n-hexane and drying to obtain the catalyst. When a $TiCl_4$ treatment was used, the recovered solids were contacted with the $TiCl_4$/n-heptane solution as described before. The recovered, treated solids were washed with n-hexane to remove the unreacted $TiCl_4$ and dried to yield the catalyst.

In the catalyst preparations, the quantities of components employed in the composition are detailed in the following Table I. The approximate ranges of components are shown in terms of mmoles. Silica: 0–140; organic compound: 0.3–9; initial $TiCl_4$: 0–17; di-n-butylmagnesium, ($Bu_2Mg$), as Magala: 0.2–4.5; triethylaluminum, (TEA), 0.03–2.0, final $TiCl_4$ treatment: 0–19. Toluene was employed in the range of about 15 to 40 mL and n-hexane from about 8.5 to 30 mL. The amount of Ti employed for the catalysts, based on the weights of silica (if used), organic compound and initial TiCl₄, in terms of weight percent can range from about 1 to about 10, or more, e.g. to about 20, and preferably from about 1.5 to about 10.

Still further, as shown in Table I, the diarylamine and a halogenated transition metal compound can be reacted to form a catalyst precursor which can be admixed with silica. the composition can then be sequentially treated with the organometallic compound comprising a dihydrocarbylmagnesium compound and the same or a different halogenated transition metal compound previously used.

To prepare catalyst 18, 4.9 g (81.7 mmoles) of silica, precalcined at 750° C., was slurried in toluene. A solution containing 20 mL of toluene, 0.35 g (2.07 mmoles) of diphenylamine ($\phi_2$NH) and 0.41 g (2.18 mmoles) of TiCl₄ was prepared and admixed with the silica slurry. The solvent was removed by evaporation, the product was reslurried in n-heptane and the solvent was again removed by evaporation. The dry product was slurried in n-heptane and mixed with 12.8 mL (4.48 mmoles) Magala to give a black colored reaction mixture. The mole ratios of $\phi_2$NH:TiCl₄:Magala are about 1:1:2. The solvent in the Magala-containing mixture was evaporated and to the dry product was added 3.45 g (18.2 mmoles) of TiCl₄ and 8.0 mL of n-heptane. The mixture was heated, the product was washed with n-heptane and solvent evaporated as before to obtainn the catalyst. The final mole ratios of TiCl₄:$\phi_2$NH:Magala was about 9.8:1:2.2.

As further shown in Table I, a catalyst precursor can be formed by reacting a diarylamine with an organometallic compound comprising a dihydrocarbylmagnesium compound in the presence of silica. The precursor is subsequently treated wih a halogenated transition metal compound to form the catalyst.

As an example, to prepare catalyst 17, 4.72 g (78.7 mmoles) of screened silica (140–200 mesh) was slurried in toluene and admixed with 23 mL of a solution formed from 0.59 g (3.49 mmoles) of $\phi_2$NH dissolved in 20 mL of toluene and 10.0 mL (3.5 mmoles) of Magala (1:1 mole ratio of $\phi_2$NH:Magala), yielding a green colored mixture. The solvent was evaporated, the product reslurried in n-heptane and the solvent again evaporated. To this product was added 2.76 g (14.6 mmoles) of TiCl₄ dissolved in 8.4 mL of n-heptane. The mixture was heated at about 100° C. as before, the product was washed with n-heptane to remove unreacted TiCl₄ and/or soluble by-products and the solvent removed to obtain the catalyst. The mole ratios of TiCl₄:$\phi_2$NH:Magala was 5.5:1:1.

In yet another embodiment, as summarized in Tabel I, a triarylphosphine oxide can be reacted with an organometallic compound comprising a dihydrocarbyl-magnesium compound to produce a catalyst precursor. The precursor can be admixed with silica to form a composition which is subsequently treated with a halogenated transition metal compound to form the catalyst.

As an example, to prepare catalyst 15, 1 g (3.6 mmoles) of triphenylphosphine oxide, ($\phi_3$PO), was slurried in a little toluene, while stirring, 10.2 mL (3.6 mmoles) of Magala (1:1 molar ratio of $\phi_3$PO:Magala) was added and then 3.4 g (56.7 mmoles) of silica, precalcined at 600° C. was mixed into the slurry. The solvent ws evaporated from the reaction mixture. The product was reslurried in n-heptane and the solvent again removed by evaporation. To the dry product was added 1.7 g (9.1 mmoles) of TiCl₄ admixed with 9.0 mL of n-heptane and the stirred mixture was heated to about 100° C. for about 5 to 10 minutes. The treated mixture was subsequently recovered, washed at about 25° C. with n-heptane to remove unreacted TiCl₄ and/or soluble by-products and the product dried to obtain the catalyst.

In yet another aspect of the invention summarized in Table I, a catalyst can be formed by combining a triarylphosphiate and a halogenated transition metal compound in the presence of silica to form an intermediate composition which is treated with the organometallic compound, to produce the catalyst.

As an example, to prepare catalyst 16, 3.4 g (56.7 mmoles) of screened silica (140–200 mesh) was slurried in n-pentane and mixed with 1.5 mL (5.73 mmoles) of triphenylphosphite ($\phi$O)₃P. The slurry was mixed with 3.10 g (16.3 mmoles) of TiCl₄ yielding a red reaction mixture from which the solvent was evaporated. To the product was admixed 8.0 mL of Magala (2.8 mmoles) giving a reddish-brown color and a mole ratio of 2.8 moles TiCl₄:1 mole ($\phi$O)₃P:0.49 mole Magala. The product was washed with n-heptane to remove unreacted TiCl₄ and/or soluble by-products and the solvent removed by evaporation to obtain the catalyst.

The nature of the catalyst precursor formed, weight percent of initial Ti based on silica used and precursor used and various mole ratios employed are detailed in Table I.

TABLE I

| | | | | Moles of Components | | | Hypothetical | Org. Mole Ratios | | | |
| | Silica | | | | | | | Silica | Org. | | |
| Cat. No. | Calcining Temp, °C. | Organic cpd. | Silica | Org. cpd. | R₂Mg | Initial TiCl₄ | Final TiCl₄ | Catalyst Precursor | Org. cpd | cpd. R₂Mg | Org. cpd. Initial TiCl₄ | Wt. % Ti(h) |
|---|---|---|---|---|---|---|---|---|---|---|---|---|
| 1 | 750 | TPS(a) | 55 | 0.7 | 0.7 | 0 | 9.1 | $\phi_3$SiOMgR(c) | 16 | — | — | ~10(g) |
| 2 | no silica | DPS(b) | 0 | 9.2 | 4.5 | 9.1 | 0 | $\phi_2$Si(OH)OTiCl₃ | — | 2 | 1 | ~10 |
| 3 | 750 | DPS | 63 | 4.6 | 2.3 | 4.6 | 0 | $\phi_2$Si(OH))TiCl₃ | 14 | 2 | 1 | 3.8 |
| 4 | 700 | TPS | 55 | 4.6 | 2.2 | 4.6 | 9.1(d) | $\phi_3$SiOTiCl₃ | 12 | 2 | 1 | 4.0 |
| 5 | 750 | TPS | 45 | 2.0 | 2.0(e) | 2.0 | 9.1 | $\phi_3$SiOTiCl₃ | 22 | 1(f) | 1 | 2.6 |
| 6 | 750 | TPS | 43 | 1.1 | 0.56 | 1.1 | 9.1 | $\phi_3$SiOTiCl₃ | 39 | 2 | 1 | 1.7 |
| 7 | 750 | TPS | 138 | 0.35 | 0.175 | 0.36 | 9.1 | $\phi_3$SiOTiCl₃ | 390 | 2 | 1 | 0.21 |
| 8 | 750 | TPS | 52 | 2.5 | 2.6 | 2.5 | 9.1 | $\phi_3$SiOTiCl₃ | 21 | 1 | 1 | 2.8 |
| 9 | 750 | TPS | 68 | 6.8 | 3.4 | 6.9 | 9.1 | $\phi_3$SiOTiCl₃ | 10 | 2 | 1 | 4.5 |
| 10 | 750 | TPS | 42 | 2.1 | 1.1 | 2.1 | 9.1 | $\phi_3$SiOTiCl₃ | 20 | 2 | 1 | 2.9 |
| 11 | 750 | TPS | 73 | 0.90 | 0.45 | 0.91 | 9.1 | $\phi_3$SiOTiCl₃ | 81 | 2 | 1 | 0.90 |
| 12 | 425 | TPS | 93 | 4.7 | 2.3 | 4.7 | 9.1 | $\phi_3$SiOTiCl₃ | 20 | 2 | 1 | 2.9 |
| 13 | 260 | TPS | 80 | 4.0 | 2.0 | 4.0 | 9.1 | $\phi_3$SiOTiCl₃ | 20 | 2 | 1 | 2.9 |
| 14 | 871 | DPS | 53 | 4.6 | 1.8 | 4.5 | 9.1 | $\phi_2$Si(OH)OTiCl₃ | 12 | 2.6 | 1 | 4.1 |
| 15 | 600 | $\phi_3$PO(i) | 56.7 | 3.6 | 3.6 | 0 | 9.1 | $\phi_3$SiOTiCl₃ | 16 | 1 | — | ~10 |
| 16 | — | ($\phi$O)₃P(j) | 56.7 | 5.7 | 2.8 | 16.3 | 0 | $\phi_2$Si(OH)OTiCl₃ | 10 | 2 | 0.35 | 9 |

TABLE I-continued

| Cat. No. | Silica Calcining Temp, °C. | Organic cpd. | Silica | Moles of Components | | | Hypothetical Catalyst Precursor | Org. Mole Ratios | | | |
|---|---|---|---|---|---|---|---|---|---|---|---|
| | | | | Org. cpd. | $R_2Mg$ | Initial $TiCl_4$ | Final $TiCl_4$ | | Silica Org. cpd | Org. cpd. $R_2Mg$ | Org. cpd. Initial $TiCl_4$ | Wt. % $Ti^{(h)}$ |
| 17 | — | $\phi_2NH^{(k)}$ | 78.7 | 2.7 | 2.7 | 0 | 14.6 | $\phi_2NTiCl_3$ | 29 | 1 | — | ~10 |
| 18 | 750 | $\phi_2NH$ | 81.7 | 2.1 | 4.5 | 2.2 | 18.2 | $\phi_2NMgBu$ | 39 | 0.5 | 1 | 1.6 |

$^{(a)}$Triphenylsilanol
$^{(b)}$Diphenylsilanol
$^{(c)}\phi_3$ is triphenyl, R is n-butyl
$^{(d)}$Following contacting arylsilanol, silica and initial $TiCl_4$, each product of runs 4–13 was further contacted with 9.0 mL of n-heptane and 1.0 mL (9.1 moles) of the final $TiCl_4$, heated for about 1 hour at about 80° C., cooled to room temperature and the product washed with sufficient n-hexane to remove any unreacted final $TiCl_4$. The solvent was evaporated under argon or nitrogen to recover the solid catalyst.
$^{(e)}$Used triethylaluminum (TEA) in place of $R_2Mg$.
$^{(f)}$Mole ratio of Si compound:TEA.
$^{(g)}$Based on weight of silica, TPS, $R_2Mg$ and final $TiCl_4$. The actual amount of Ti is unknown but probably about 10 weight percent or less since unreacted Ti was removed in a wash step.
$^{(h)}$Weight percent based on Silica, Org. compound, $TiCl_4$.
$^{(i)}$Triphenylphosphine oxide.
$^{(j)}$Triphenylphosphite.
$^{(k)}$Diphenylamine.

EXAMPLE 2 (ETHYLENE POLYMERIZATION)

Ethylene was polmerized in individual runs employing a weighed amount of each of the above catalysts, the amounts ranging from about 0.02 to about 0.51 g. in accordance with ASTM D 1238, Conditions E and F, respectively.

The catalyst precursor employed, catalyst composition weights used, reactor pressure observed and results obtained are given in Table II.

TABLE II

| Run No. | Hypothetical Catalyst Precursor | Catalyst No. | Weight g | Reactor Pressure psia | Polymer Yield g | Calculated Productivity g/g cat/hr | Polymer | | HLMI MI | Remarks |
|---|---|---|---|---|---|---|---|---|---|---|
| | | | | | | | MI | HLMI | | |
| 1 | $\phi_3SiOMgR$ | 1 | 0.5657 | 390 | 119.7 | 212 | 3.3 | 141 | 43 | Comparative Run |
| 2 | $\phi_2Si(OH)OTiCl_3$ | 2 | 0.0450 | 385 | 502 | 11,120 | 2.1 | 75 | 36 | |
| 3 | $\phi_2Si(OH)OTiCl_3$ | 2 | 0.0190 | 280$^{(a)}$ | 510 | 53,680$^{(d)}$ | 0$^{(c)}$ | 0 | — | |
| 4 | $\phi_2Si(OH)OTiCl_3$ | 3 | 0.3394 | 385 | 82.6 | 243 | 2.0 | 67 | 34 | |
| 5 | $\phi_3SiOTiCl_3$ | 4 | 0.1467 | 385 | 385 | 2,620 | 6.0 | 240 | 40 | |
| 6 | $\phi_3SiOTiCl_3$ | 4 | 0.0428 | 285$^{(a)}$ | 553.5 | 12,930 | 0$^{(c)}$ | 0 | — | |
| 7 | $\phi_3SiOTiCl_3$ | 5 | 0.1718 | 385 | 13 | 76 | nd$^{(d)}$ | nd | — | Comparative Run |
| 8 | $\phi_3SiOTiCl_3$ | 6 | 0.2074 | 395 | 86 | 415 | nd | 36 | — | |
| 9 | $\phi_3SiOTiCl_3$ | 7 | 0.5136 | 400 | 35 | 68 | 2.3 | 104 | 45 | Comparative Run |
| 10 | $\phi_3SiOTiCl_3$ | 8 | 0.1921 | 395 | 335 | 1,740 | 6.0 | 214 | 36 | |
| 11 | $\phi_3SiOTiCl_3$ | 9 | 0.1994 | 395 | 300 | 1,500 | 20 | 743 | 37 | |
| 12 | $\phi_3SiOTiCl_3$ | 10 | 0.1756 | 385 | 101 | 575 | 4.3 | 183 | 43 | |
| 13 | $\phi_3SiOTiCl_3$ | 11 | 0.3534 | 390 | 38 | 108 | 6.0 | 265 | 44 | |
| 14 | $\phi_3SiOTiCl_3$ | 12 | 0.3191 | 390 | 407 | 1,280 | 7.6 | 259 | 34 | |
| 15 | $\phi_3SiOTiCl_3$ | 13 | 0.1529 | 390 | 51 | 334 | 2.8 | 121 | 43 | |
| 16 | $\phi_2Si(OH)OTiCl_3$ | 14 | 0.0578 | 390 | 270 | 4,670 | 0.81 | 36 | 45 | |
| 17 | $\phi_3POMgBu_2$ | 15 | 0.2327 | 385 | 77.0 | 331 | 5.3 | 177 | 33 | |
| 18 | $(\phi O)_3PTiCl_4$ | 16 | 0.4684 | 405 | 20.6 | 44 | 0.3 | 23.6 | 78 | |
| 19 | $\phi_2NTiCl_3$ | 17 | 0.7527 | 385 | 111.5 | 148 | 0 | 0 | — | |
| 20 | $\phi_2NMgBu$ | 18 | 0.4461 | 390 | 412 | 792 | 2.9 | 124 | 42 | |

$^{(a)}$Hydrogen absent from reactor.
$^{(b)}$Actual 30 minute run giving a calculated productivity of 26,840 g polymer per g catalyst per 0.5 hour, assuming a linear activity, the value given in table is 26,840 × 2 or 53,680.
$^{(c)}$Too low to measure.
$^{(d)}$No determination made.

Each run was conducted for 1 hour, unless indicated otherwise, at 80° C., in a 1 gallon, stirred stainless steel reactor containing 1.2 liters of isobutane as diluent, an ethylene partial pressure of 100 psi (0.69 M Pa), a hydrogen partial pressure (when used) of 100 psi, with the total reactor pressure measured as lbs/square inch absolute (psia) and as cocatalyst, 1 mL of a n-heptane solution of triisobutylaluminum (TIBA) containing 15 weight percent TIBA, equivalent to 0.6 mmole TIBA.

Each reaction was terminated by discontinuing the heating of the reactor and venting the gaseous rector contents. The polymer was recovered, dried and weighed to ascertain the yield, and from the yield, the productivity of the catalyst composition in terms of grams polymer per gram catalyst per hour (g/g cat/hr). The dried, recovered polymer was stabilized with a conventional antioxidant system and the melt index (MI) and high load melt index (HLMI) determined in The results in Table II show that catalysts active for ethylene polymerization were obtained in all instances. Hydrogen can be employed during polymerization to regulate polymer molecular weight giving an increase in melt index, as known in the art and as expected depresses catalyst activity somewhat. These effects can be seen by comparing melt index and productivity values for runs 2, 3 and for runs 5, 6. The values for HLMI/MI, generally about 40, indicate that moderately narrow molecular weight distribution polymer was probably obtained in all instances although probably not as narrow as the molecular weight distribution of polymer obtained with conventional transition metal catalysts, which usually yields an HLMI/MI value in the range of 28–30. In other words, it would appear that the present catalyst yields a polymer having a somewhat broader molecular weight distribtuion than conventional polymerization catalysts.

Generally, calculated productivities of the most active invention catalysts range from about 240 to about 4700 g polymer per g catalyst per hour in the presence of silica and hydrogen and can reach to about 54,000 g polymer per g catalyst per hour in the absence of hydrogen and silica. Run 1 catalyst shows a relatively low activity where organosilanol and R$_2$Mg are reacted before contact with TiCl$_4$ is made. Preferably, the organosilanol and TiCl$_4$ are reacted before contact with R$_2$Mg is made. The catalyst employed in run 7 is relatively inactive and this catalyst was made using TEA rather than the R$_2$Mg-TEA combination employed in preparing the other catalysts. It appears tht R$_2$Mg and TEA are not equivalent in catalyst preparation. It is believed the low productivity values of runs 9 and 13 are attributable to the low Ti concentration of less than about 1 weight percent in preparing the catalysts.

When silica is employed in catalyst production, the polymerization results in runs 1, and 4-16 suggest that it should be previously calcined in air (activated) at temperatures in the range of about 260° C. to about 1000° C., preferably about 700° C. to 1000° C., to obtain higher catalytic activity.

Although catalysts productivites in the presence of silica appear to be relatively low, if these values are given in terms of only the active components of the catalyst then values similar to those of runs 2 and 3 are obtained. The advantage of employing silica in catalyst production is that the particle size of the polymer particles made with such catalysts tends to be relatively large and particle size distribution relatively narrow. These properties make it easier to process such polymers. For example, the polymer made in run 14 was sieved using U.S. Sieve Size screens. The results showed that about 86 weight percent of the polymer was retained on the 30 mesh screen, about 10 weight percent on the 50 mesh screen, about 2.3 weight percent on the 80 mesh screen and about 1.6 weight percent total on the 100 mesh and 200 mesh screens.

Run 19 shows that catalyst 17, in combination with a cocatalyst as define herein can produce very high molecular weight ethylene polymers even in the presence of substantial amounts of hydrogen in the reactor, e.g. equal partial pressures of ethylene and hydrogen.

Run 20 shows that catalyst 18, in combination with the same cocatalyst as before, has about 5 times the activity of the preceding catalyst system under identical reaction conditions. Also, lower molecular weight ethylene polymers are produced which are readily processable in conventional fabrication apparatus, e.g. extruder, injection molder. The order of contacting reactants is thus shown to be important in producing catalysts which can have quite different behavior in ethylene polymerization depending upon the process chosen in forming the catalyst.

Run 17 shows that catalyst 15 in combination with the same cocatalyst as before and under the same polymerization conditions as before has approximately twice the activity of catalyst 17 while yielding ethylene polymers somewhat easier processing than those of catalyst 18, e.g. 5.3 melt index polymer with catalyst 15 vs. 2.0 melt index polymer with catalyst 18.

Run 18 shows that catalyst 16 in combination with the same cocatalyst and same polymerization conditions previously employed was found to be substantially less active than catalyst (15), (17) and (18) in ethylene polymerization.

That which is claimed is:

1. A process comprising contacting a first reactant selected from the group consisting of R$_2$Si(OH)$_2$ and R$_3$SiOH, where R represents an aryl group having from 6 to about 20 carbon atoms and a second reactant comprising a halogenated transition metal compound represented by the formula $$M(OR')_vX_{w+1}$$

wherein M represents a transition metal selected from the group consisting of Group IVB, VB and VIB of the Periodic Table, R' comprises a hydrocarbyl moiety having from 1 to about 20 carbon atoms, X represents a halogen atom selected from the group consisting of chlorine, bromine and iodine, v equals 0, 1, 2 or 3, w equals 1, 2, 3 or 4, and v+w+1 equals the valence of M, to produce a catalyst precursor.

2. A process as in claim 1 wherein each R comprises an aryl group having from 6 to 10 carbon atoms, M comprises titanium, v equals 0, w equals 3 and X comprises chlorine.

3. A process as in claim 2 werein the first reactant comprises diphenylsilanol.

4. A process as in claim 2 wherein the first reactant comprises triphenylsilanol.

5. A composition resulting from a process as set forth in claim 1.

6. A composition resulting from a process as set forth in claim 2.

7. A composition as in claim 6 further characterized by being deposited on a particulate substrate selected from the group consisting of silica, silica-alumina, silica-titania, silica-boria, silica-thoria, silica-zirconia, aluminum phosphate, magnesium dichloride, magnesium oxide, polyphenylene sulfide, polyethylene and polypropylene.

8. A process as in claim 1 further comprising treating the catalyst precursor with an organometal treating agent selected from the group consisting of dialkylmagnesium compounds, mixtures comprising dialkylmagnesium compounds and trialkyl-aluminum compounds and Grignard reagents in which each hydrocarbon radical contains from about 1 to about 20 carbon atoms to produce a catalytic component.

9. A process as in claim 8 further comprising treating the thus produced catalytic component with a halide ion exchanging source represented by the formula $$M'X_a(OR')_{b-a}$$

wherein M' is selected from the group consisting of zirconium, titanium, vanadim, silicon and tin, R' comprises hydrocarbyl having from 1 to about 20 carbon atoms, a equals 1, 2, 3, 4, or 5, b equals the valence of M', and X represents a halogen selected from the group consisting of chlorine, bromine and iodine.

10. A process as in claim 1 further comprising treating the catalyst precursor with an organometal treating agent selected from the group consisting of dialkylmagnesium compounds, mixtures comprising dialkylmagnesium compounds and trialkyl-aluminum compounds and Grignard reagents in which each hydrocarbon radical contains from about 1 to about 20 carbon atoms wherein the catalyst precursor is represented by the formula $$R_rSi(OH)_u(OM(OR')_vX_w)_z$$

wherein each R comprises an aryl group containing from 6 to about 20 carbon atoms, R' comprises a hydrocarbyl group containing from 1 to about 20 carbon atoms, t equals 2 or 3, u equals 0 or 1, M comprises a transition metal selected from Group IVB, VB, or VIB of the Periodic Table, v is 0, 1, 2, or 3, X represents a halogen atom selected from the group consisting of chlorine, bromine and iodine, w equals 1, 2, 3, or 4, z equals 1 or 2, v+w+1 equals the valence of M, and t+u+z=4, to produce the catalytic component.

11. A process as in claim 10 further comprising treating the thus produced catalytic component with a halide ion exchanging source represented by the formula $$M'X_a(OR')_{b-a}$$

wherein M' is selected from the group consisting of zirconium, titanium, vanadium, silicon and tin, R' comprises hydrocarbyl having from 1 to about 20 carbon atoms, a equals 1, 2, 3, 4 or 5, be equals the valence of M', and X represents a halogen selected from the group consisting of chlorine, bromine and iodine.

12. A composition formed according to the proces of claim 8.

13. A composition as in claim 12 further characterized by being deposited on a particulate material selected from the group consisting of silica, silica-alumina, silica-titania, silica-boria, silica-thoria, silica-zirconia, aluminum phosphate, magnesium dichloride, magnesium oxide, polyphenylene sulfide, polyethylene and polypropylene.

14. A composition formed according to the process of claim 9.

15. A composition as in claim 14 further characterized by being deposited on a particulate material selected from the group consisting of silica, silica-alumina, silica-titania, silica-boria, silica-thoria, silica-zirconia, aluminum phosphate, magnesium dichloride, magnesium oxide, polyphenylene sulfide, polyethylene and polypropylene.

* * * * *